United States Patent
Chiu

(10) Patent No.: US 6,978,878 B2
(45) Date of Patent: Dec. 27, 2005

(54) CONTINUOUS FEEDING DEVICE FOR A SINGLE LAYER COLOR FILM PACKAGING MACHINE

(76) Inventor: Shao Yi Chiu, PO Box 82-144, Taipei (TW)

(*) Notice: Subject to any disclaimer, the term of this patent is extended or adjusted under 35 U.S.C. 154(b) by 23 days.

(21) Appl. No.: 10/737,774

(22) Filed: Dec. 18, 2003

(65) Prior Publication Data

US 2005/0133341 A1  Jun. 23, 2005

(51) Int. Cl.[7] .............................................. B65G 47/26
(52) U.S. Cl. ................. 198/419.3; 198/426; 198/460.1
(58) Field of Search .................... 198/464.1, 464.2, 198/464.3, 437, 460.1, 432, 426, 418.7, 419.1

(56) References Cited

U.S. PATENT DOCUMENTS

| | | | | |
|---|---|---|---|---|
| 3,823,813 A | * | 7/1974 | Holt | 198/418.1 |
| 3,938,650 A | * | 2/1976 | Holt | 198/419.3 |
| 4,120,393 A | * | 10/1978 | Motooka et al. | 198/460.1 |
| 4,216,855 A | * | 8/1980 | Raudat | 198/633 |
| 5,667,055 A | * | 9/1997 | Gambetti | 198/419.3 |
| 6,209,706 B1 | * | 4/2001 | Tod, Jr. | 198/418 |
| 6,793,064 B2 | * | 9/2004 | Schoeneck et al. | 198/419.3 |
| 6,837,360 B2 | * | 1/2005 | Schoeneck | 198/426 |

* cited by examiner

Primary Examiner—James R. Bidwell
(74) Attorney, Agent, or Firm—Leong C. Lei

(57) ABSTRACT

A continuous feeding device for a single layer color film packaging machine includes a pair of chains mounted at two sides above a conveyor belt, the chains being engaged with a plurality of gears, a plurality of a linking rods equidistantly mounted between the two chains, two first sensors disposed close to an outer side of one of the chains for detecting the linking rods, a platform installed at an end of the conveyor belt, an electric motor mounted beside the conveyor belt and being drivingly connected with an axle on which are fixedly mounted two of the gears engaged with the chains, and two second sensors each mounted close to an outer side of a respective one of the chains, the two second sensors being aligned with each other, whereby the articles can be continuously packaged thus increasing the efficiency.

2 Claims, 6 Drawing Sheets

CONTINUOUS FEEDING DEVICE FOR A SINGLE LAYER COLOR FILM PACKAGING MACHINE

BACKGROUND OF THE INVENTION (a) Technical Field of the Invention

This invention is related to a continuous feeding device for a single layer color film packaging machine which can increase the packaging efficiency.

(b) Description of the Prior Art

As shown in FIGS. 1 and 2, the conventional packaging machine 1 generally includes a frame on which are mounted an upper and lower shrinking films 2. As the articles 3 to be packaged are transmitted to the platform by a conveying system 4, the piston rod of a pneumatic cylinder 5 will push the articles 3 (such as beer, soft drinks, . . . etc.) to the other side of the platform and then the articles 3 are packaged by the shrinking film 2. Thereafter, the shrinking film is severed by a cutter and finally the articles 3 are transmitted to a shrinking machine for shrinking the film 2.

However, there are the following drawbacks in using the pneumatic cylinder 5 to push the articles 3 for packaging:

Firstly, since the pneumatic cylinder 5 is used for pushing articles 3 for cutting and packaging operations, the conveyor system 4 must stop when the pneumatic cylinder 5 pushes out its piston rod until the piston rod retracts into the pneumatic cylinder 5 thereby interrupting the packaging and conveying operations and therefore lowering the efficiency.

Secondly, the articles 3 (such as half a dozen or a dozen of beer, or soft drink) may not be arranged in order if the air supplied to the pneumatic cylinder 5 is not steady thus influencing the packaging outlook.

Therefore, it is an object of the present invention to provide a continuous feeding device for a single layer color film packaging machine which can obviate and mitigate the above-mentioned drawbacks.

SUMMARY OF THE INVENTION

This invention is related to a continuous feeding device for a single layer color film packaging machine.

It is the primary object of the present invention to provide a continuous feeding device for a single layer color film packaging machine which can continuously feed articles for packaging.

It is another object of the present invention to provide a continuous feeding device for a single layer color film packaging machine which can prevent the articles to be packaged from becoming disordered.

It is a further object of the present invention to provide a continuous feeding device for a single layer color film packaging machine which can group the articles to be packaged in desired order.

According to a preferred embodiment of the present invention, a continuous feeding device for a single layer color film packaging machine includes a pair of chains mounted at two sides above a conveyor belt, the chains being engaged with a plurality of gears, a plurality of a linking rods equidistantly mounted between the two chains, two first sensors disposed close to an outer side of one of the chains for detecting the linking rods, a platform installed at an end of the conveyor belt, an electric motor mounted beside the conveyor belt and being drivingly connected with an axle on which are fixedly mounted two of the gears engaged with the chains, and two second sensors each mounted close to an outer side of a respective one of the chains, the two second sensors being aligned with each other, whereby the articles can be continuously packaged thus increasing the efficiency.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 2:
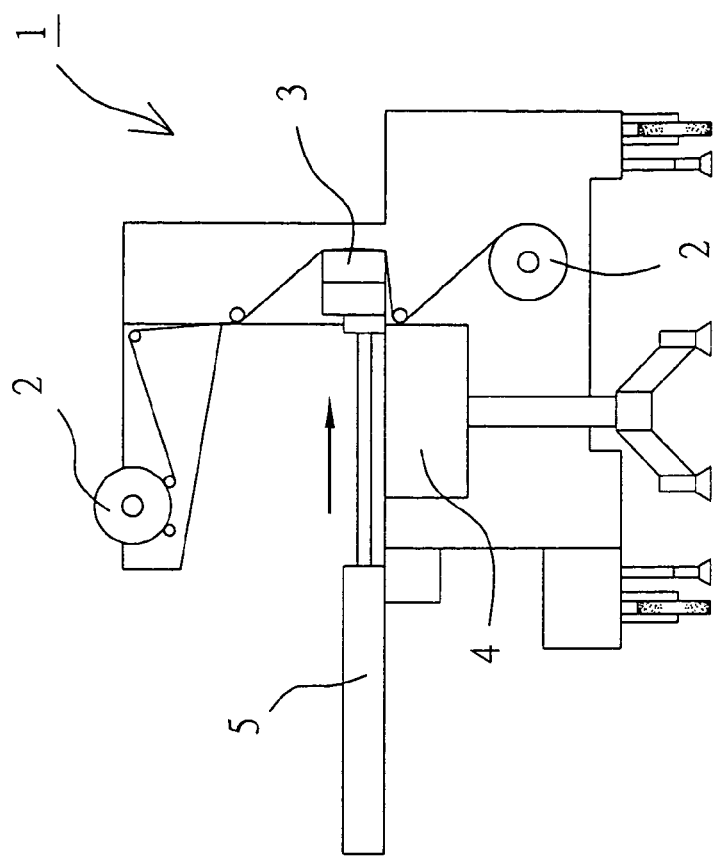
FIG. 2 illustrates the operation of the conventional packaging machine.
Figure 1:
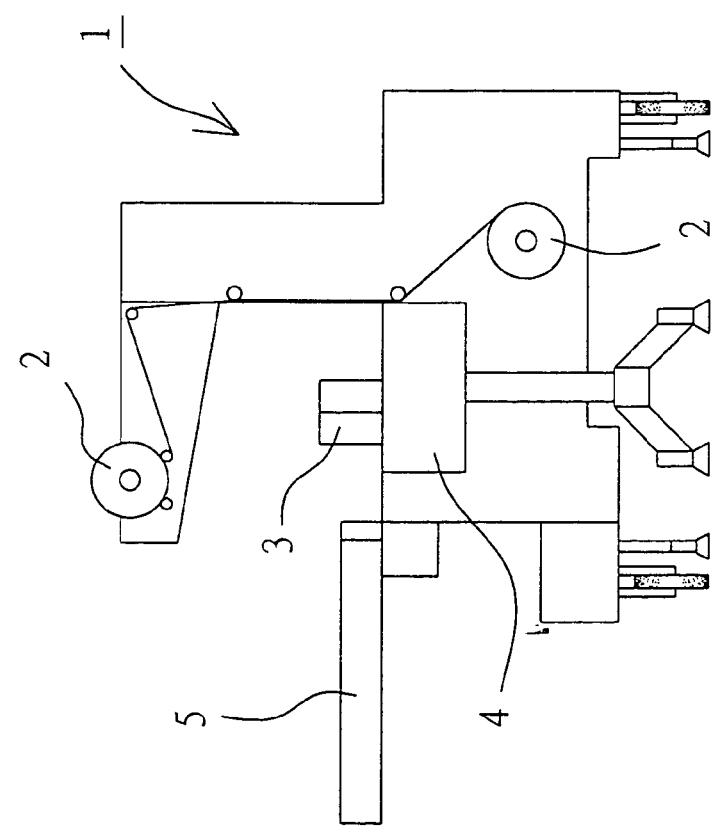
FIG. 1 is a front view of a conventional packaging machine.
Figure 3:
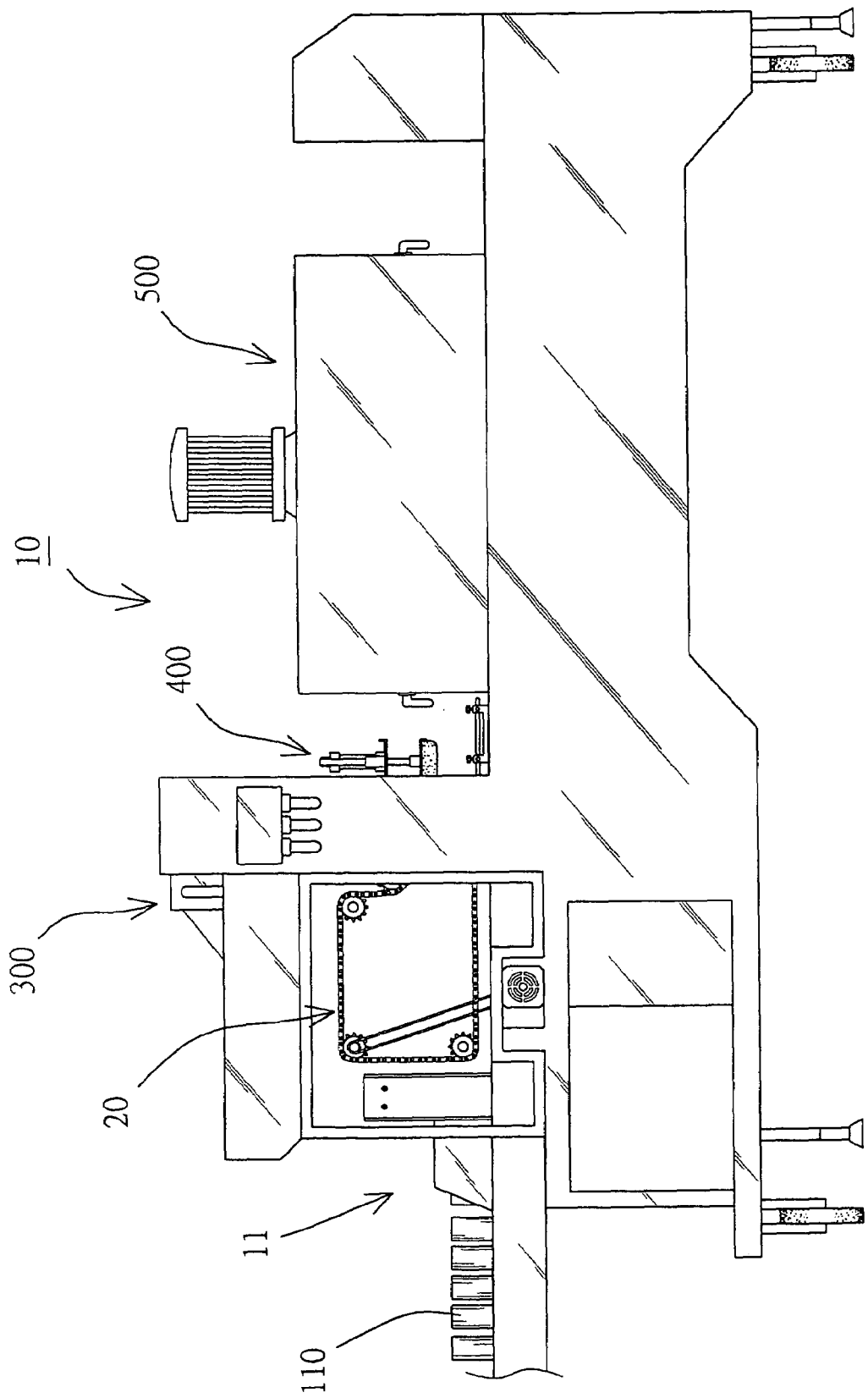
FIG. 3 is a front view of a single layer color film packaging machine according to the present invention.

With reference to the drawings and in particular to FIG. 3 thereof, the packaging machine 10 according to the present invention generally comprises a supplying system 11 for supplying articles 110 in a predetermined quantity (such as 6, 12 bottles . . . etc.) to a feeding device 20. Then, the feeding device 20 causes the packaging film 300 to wrap the articles 110 and the packaging film 300 is severed by a cutter. Thereafter, the articles 110 are transmitted to a shrinking device 500 for shrinking the packaging film 330 on the articles 110.

Figures 4, 4A:
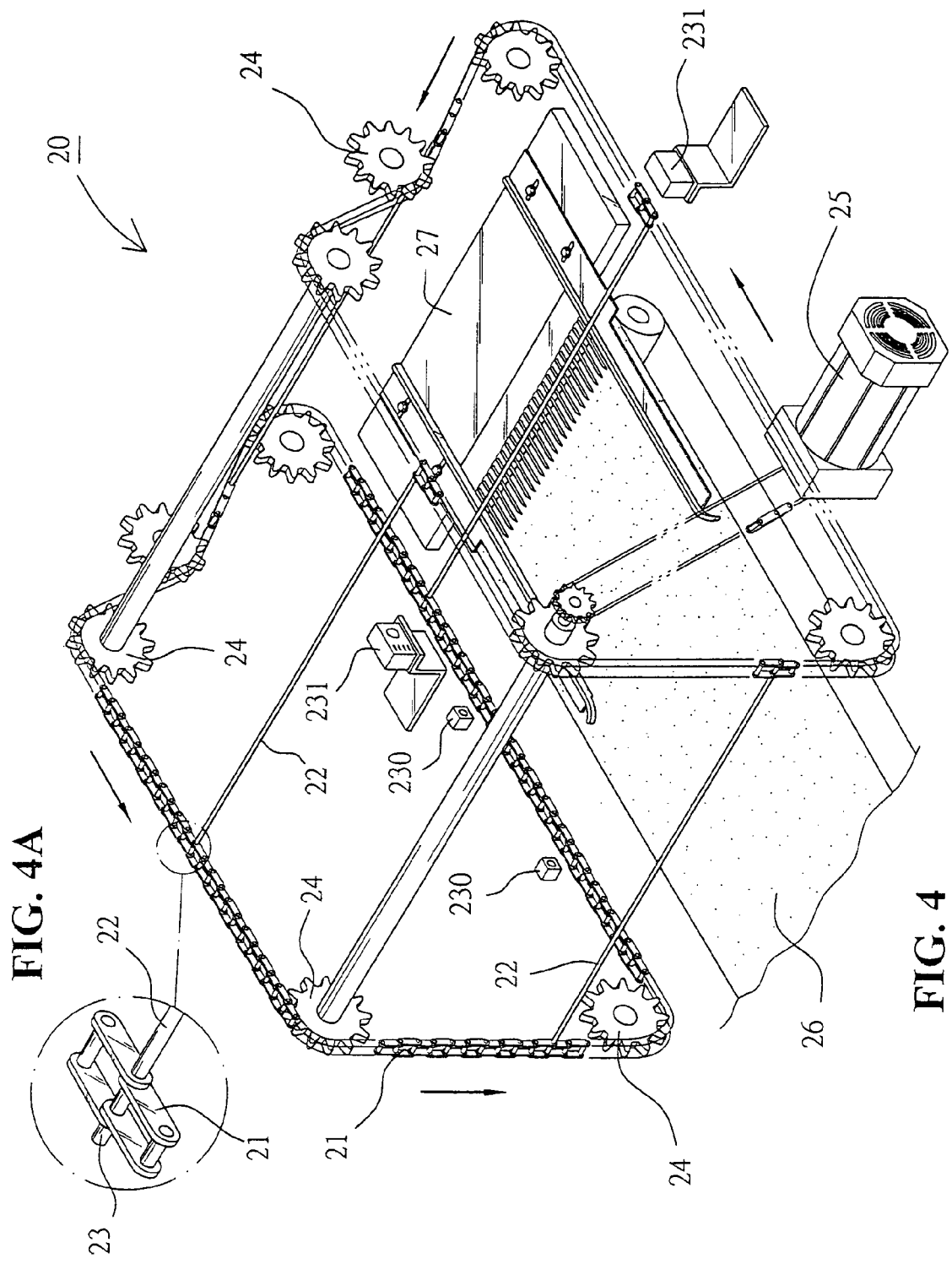
FIG. 4 is a perspective view of a continuous feeding device for the single layer color film packaging machine according to the present invention.
Figure 5A:
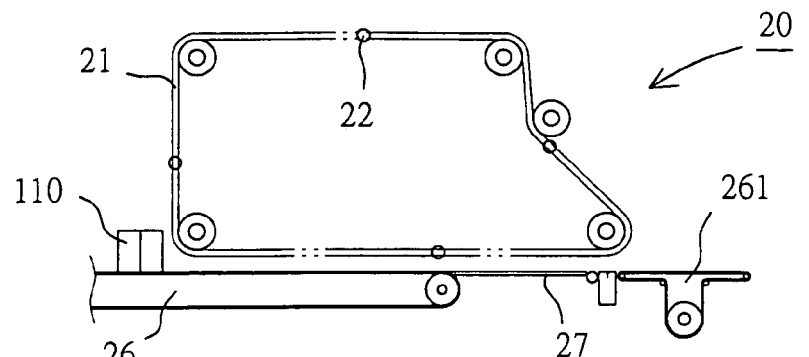
FIGS. 5A, 5B, 5C, 5D and 5E illustrate the working principle of the present invention.
Figure 5B:
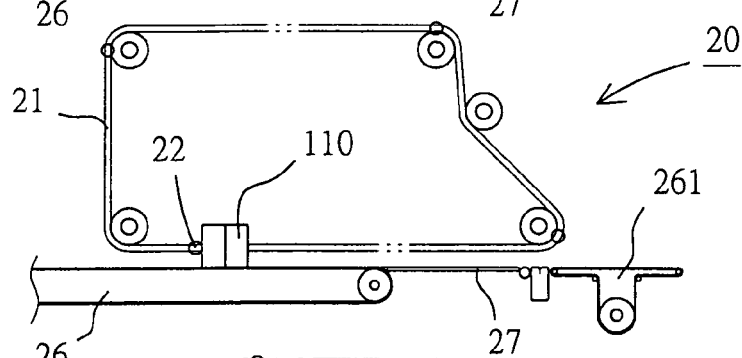
Figure 5C:
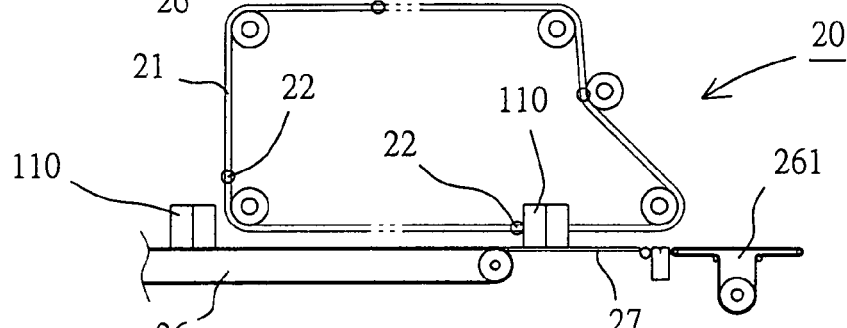
Figure 5D:
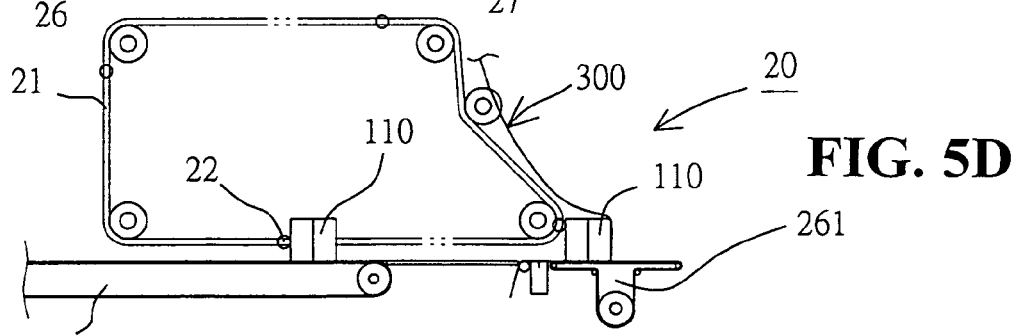
Figure 5E:
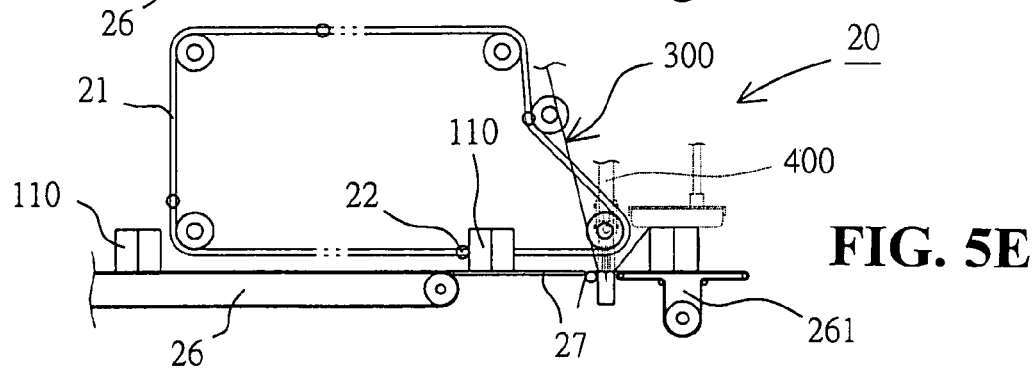

Referring to FIG. 4, the feeding device 20 comprises a pair of chains 21 mounted at two sides above a conveyor belt 26. The chains 21 are engaged with a plurality of gears 24. A plurality of linking rods 22 are equidistantly mounted between the two chains 21. Two sensors 230 are disposed close to the outer side of one of the chains 21 for detecting the linking rods 22. A platform 27 is installed at the rear end of the conveyor belt 26. An electric motor 25 is mounted beside the conveyor belt 26 and is drivingly connected with an axle on which are fixedly mounted two gears 24 engaged with the chains 21 so that the electric motor 25 can drive the chains 21 to move as required. Two sensors 231 are each mounted close to the outer side of each of the chains 21. The two sensors are aligned with each other.

As shown in FIG. 5, when a predetermined amount of articles 110 are transmitted by the conveyor belt 26 from the supplying system 4 to the feeding device 20, the electric motor 25 will drive the chains 21 thereby causing the linking rods 22 to move the articles 110 onto the platform 27. As the sensors 231 detect the linking rod 22, the electric motor 25 will stop so that the articles 110 will remain on the platform 27. When another set of articles 110 are transmitted to feeding device 20, the electric motor 25 will be turned on again to drive the chains 21 and the linking rod 22 will move out the first set of articles 110 on the platform 27 for wrapping by a packaging film 300 and at the same time move the second set of articles 110 onto the platform 27. Meanwhile, the packaging film 100 wrapping the first set of articles 110 is severed by a cutter (not shown) and then the articles 110 are transmitted to a shrinking device for shrinking the packaging film 100.

Figure 6:
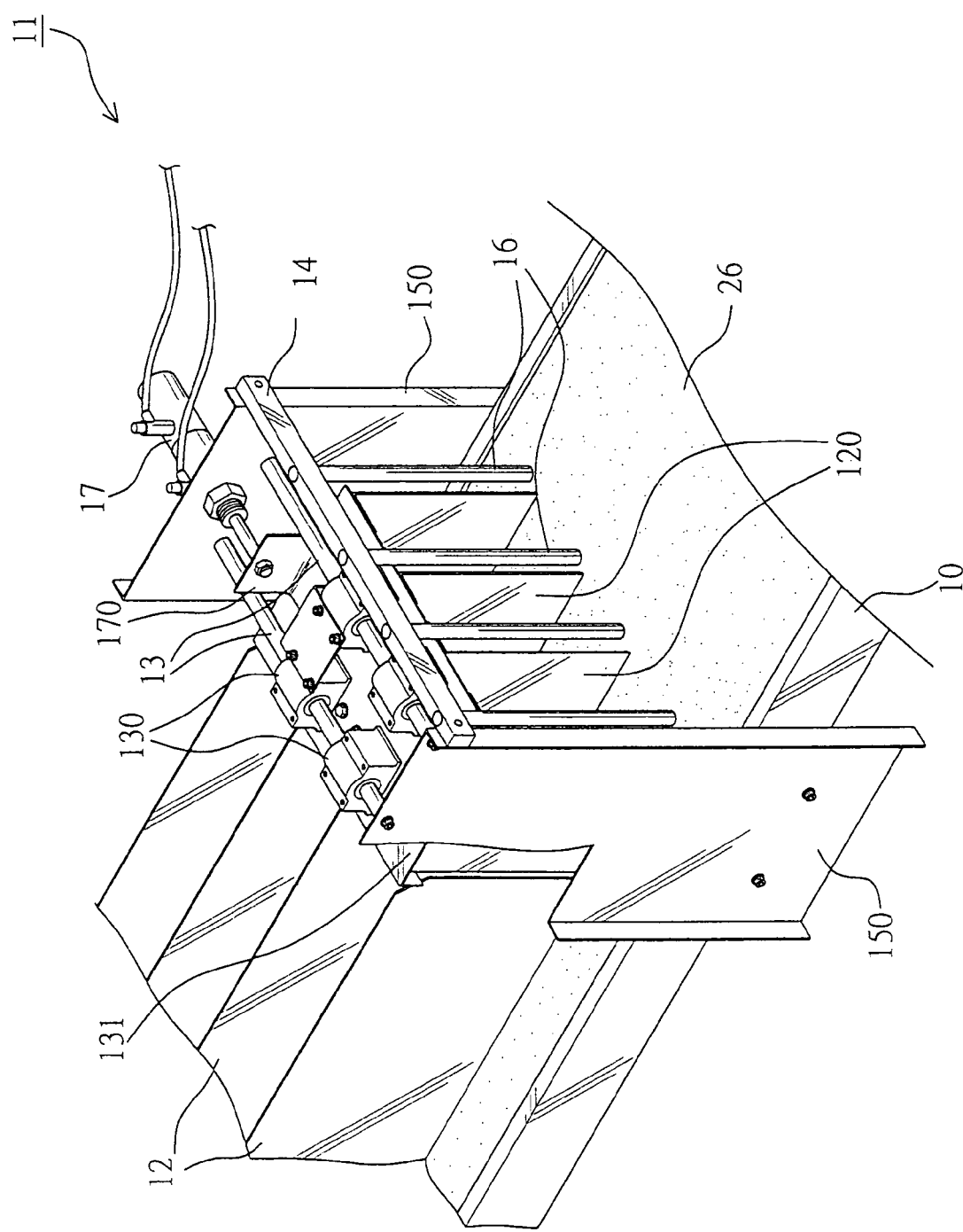
FIG. 6 is a perspective view of a supplying system according to the present invention.

The supplying system 11 is arranged before the feeding device 11 above the conveyor belt 26. As shown in FIG. 6, the supplying system 11 comprises a pair of upright supporters 150, a cross bar 14 mounted between the two upright supporters 150, a plurality of rods 16 extending downwardly from the cross bar 13, two guide rods 13 are mounted between the two upright supporters 150, two pairs of sliding seats 130 each pair mounted on one of the guide rods 13, a plate 131 mounted on the bottom of the sliding seats 130. On the bottom of the plate 131 are mounted a plurality of downwardly extending movable partitions 120 forming a plurality of chambers each aligned with a respective one of the rods 16. A plurality of fixed partitions 12 are installed behind the movable partitions 120 above the conveyor belt 26. The piston rod of a pneumatic cylinder 17 is connected with a connecting plate 170 which is fixedly mounted on the sliding seats 130.

Figure 7A:
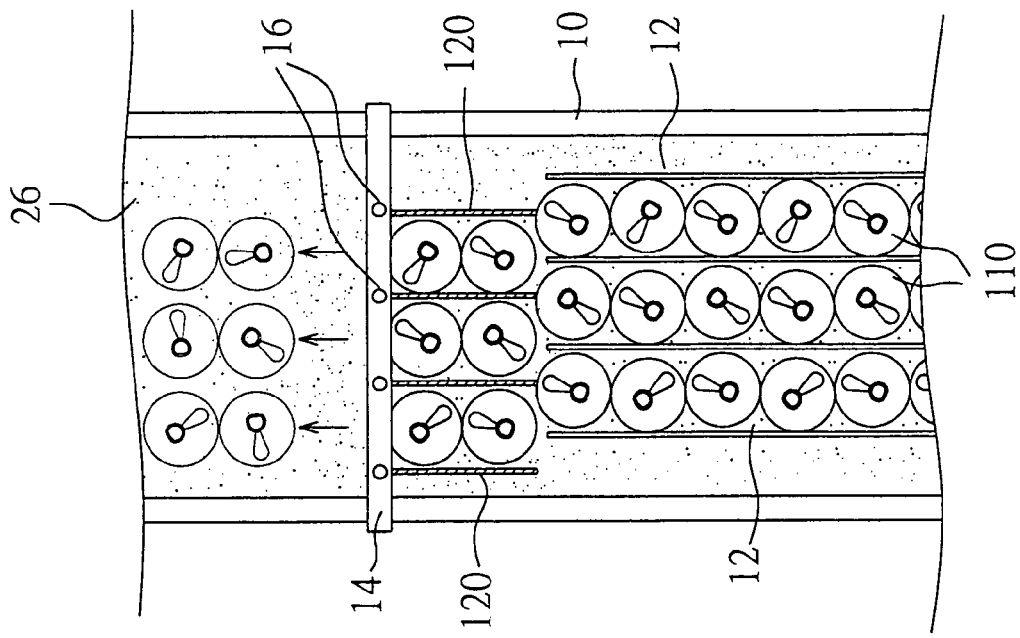
FIG. 7 illustrates the working principle of the supplying system.
Figure 7B:
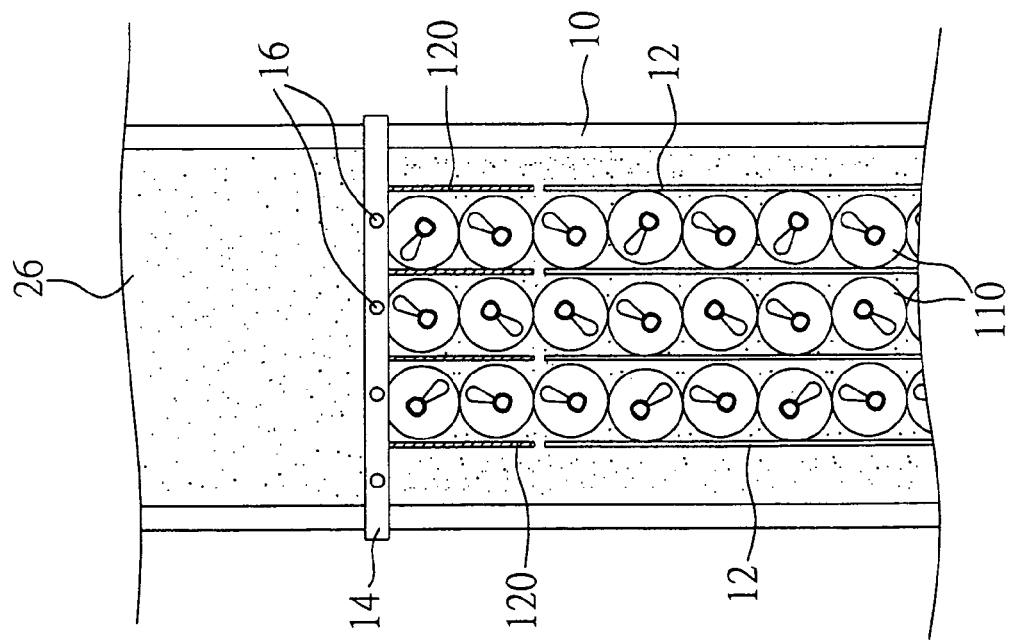

Referring to FIGS. 7A and 7B, the fixed partitions 12 are used for grouping the articles 110 on the conveyor belt 26 and the articles 110 are then transmitted to the movable partitions 120 and stopped by the rods 16. As the pneumatic cylinder 17 moves the plate 131, the plate 131 will slide along the guide rod 13 thereby making the movable partitions 120 to bias a predetermined amount of the articles 110 to the position where the articles 110 will not be blocked by the rods 16. Then, the articles 110 can be transmitted to the feeding device 20.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A continuous feeding device for a single layer color film packaging machine comprising:
    a pair of chains mounted at two sides above a conveyor belt, said chains being engaged with a plurality of gears;
    a plurality of linking rods equidistantly mounted between said two chains;
    two first sensors disposed close to an outer side of one of said chains for detecting said linking rods;
    a platform installed at an end of said conveyor belt;
    an electric motor mounted beside said conveyor belt and being drivingly connected with an axle on which are fixedly mounted two of said gears engaged with said chains; and
    two second sensors each mounted close to an outer side of a respective one of said chains, said two second sensors being aligned with each other.

2. The continuous feeding device for a single layer color film packaging machine as claimed in claim 1, further comprising a supplying system arranged before said feeding device above said conveyor belt, said supplying system comprising a pair of upright supporters, a cross bar mounted between said two upright supporters, a plurality of rods extending downwardly from said cross bar, two guide rods mounted between said two upright supporters, two pairs of sliding seats, each pair mounted on one of said guide rods, a plate mounted on a bottom of said sliding seats, a plurality of downwardly extending movable partitions mounted on a bottom side of said plate thereby forming a plurality of chambers each aligned with a respective one of said rods, a plurality of fixed partitions installed behind said movable partitions above said conveyor belt, and a pneumatic cylinder having a piston rod connected with a connecting plate which is fixedly mounted on said sliding seats.

* * * * *